(12) United States Patent
Robinson

(10) Patent No.: US 8,511,614 B2
(45) Date of Patent: Aug. 20, 2013

(54) SATELLITE SYSTEM PROVIDING OPTIMAL SPACE SITUATIONAL AWARENESS

(75) Inventor: Ian Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 702 days.

(21) Appl. No.: 12/728,706

(22) Filed: Mar. 22, 2010

(65) Prior Publication Data

US 2011/0226907 A1    Sep. 22, 2011

(51) Int. Cl.
*B64G 1/10* (2006.01)

(52) U.S. Cl.
USPC ........................................................ 244/158.4

(58) Field of Classification Search
USPC .. 244/158.4, 158.5, 158.6, 158.1; 342/357.2; 455/12.1, 427
See application file for complete search history.

(56) References Cited

U.S. PATENT DOCUMENTS

| 5,300,780 | A | * | 4/1994 | Denney et al. | 250/342 |
|---|---|---|---|---|---|
| 5,468,963 | A | * | 11/1995 | Bishop | 250/372 |
| 5,960,097 | A | * | 9/1999 | Pfeiffer et al. | 382/103 |
| 6,082,677 | A | * | 7/2000 | Kikuchi | 244/158.4 |
| 6,452,538 | B1 | * | 9/2002 | Hoffman, III | 342/352 |
| 7,806,369 | B2 | * | 10/2010 | Kawaguchi | 244/158.4 |
| 8,193,968 | B1 | * | 6/2012 | Kia et al. | 342/26 A |
| 8,240,611 | B2 | * | 8/2012 | Vance | 244/158.4 |
| 2008/0029650 | A1 | * | 2/2008 | Kawaguchi | 244/158.4 |
| 2008/0081556 | A1 | * | 4/2008 | Robinson | 455/12.1 |
| 2010/0038490 | A1 | * | 2/2010 | Hofschuster et al. | 244/158.1 |
| 2011/0049302 | A1 | * | 3/2011 | Vance | 244/158.4 |
| 2011/0084212 | A1 | * | 4/2011 | Clark | 250/370.08 |

OTHER PUBLICATIONS

Boyer, Stuart, C. et al., "Optoelectronic Techs, for Remote Sensing from Space," Proceedings SPIE, vol. 868, pp. 2-4, "Ultraviolet Surveillance of Boosters and Post-Boost Vehicles," Cannes, France (Nov. 9, 20, 1988).
Carbary, J.F., et al. "Ultraviolet and Visible imaging and Spectrographic Imaging (UVISI) Experiment," Proceedings SPIE, vol. 2217, pp. 204-212, Orlando, Fl. (Apr. 4, 6, 1994).
Rembeza, Anatoliy "Development of Spaced-Based UV-Sensors for Orbital Debris Surveillance in Russia," Proceedings SPIE, vol. 1951, pp. 48-66 Orlando, FL (Apr. 15, 16, 1993).

* cited by examiner

*Primary Examiner* — Tien Dinh
*Assistant Examiner* — Michael A Fabula
(74) *Attorney, Agent, or Firm* — Pierce Atwood LLP; Joseph M. Maraia

(57) ABSTRACT

A satellite system for observing space objects includes two or more satellites positioned in an Earth orbit and configured to observe objects in various orbits including those viewed (i) against the Earth's background; (ii) against a sunlit Earth background; and (iii) against a space background. An electromagnetic sensor may be provided on at least one of the satellites that is responsive to electromagnetic radiation having a wavelength that discriminates against substantial reflection of electromagnetic radiation from the Earth's atmosphere to observe the space object. A method of observing a space object using a satellite system is also disclosed.

38 Claims, 9 Drawing Sheets

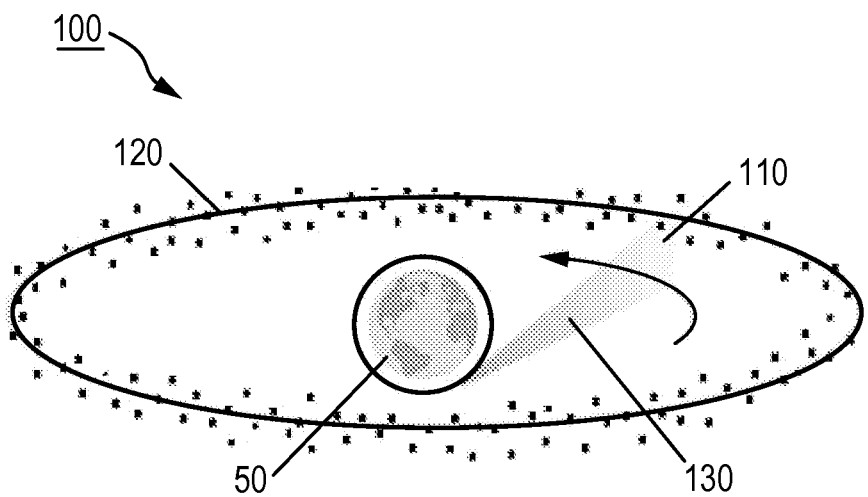
Fig. 1
(Conventional)
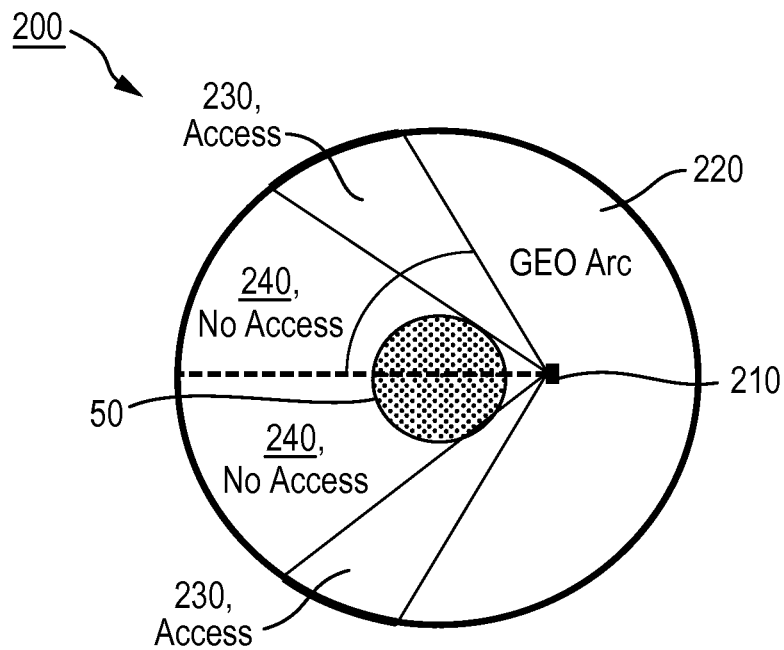
Fig. 2
(Conventional)

Access and Latency Summary

| Sensor Orbit | Number of Planes | Worst Comm Delay to single Ground Site | Maximum Outage, (hours) (Equinox, worst time of year for GEO) | Outage (hours) (95% case) |
|---|---|---|---|---|
| 2-Retro Embodiment | 1 | 3-4 hours | 1.2 (Eclipse) | 0.5 |
| 3-Retro Embodiment | 1 | 0 | 1.2 (Eclipse) | 0 |
| 3-Pro Embodiment | 1 | 0 | 1.2 (Eclipse) | ~1 |
| 2-Leo (Conventional) | 1 | > 12 hrs | 3.7 | >3 |
| 2-Leo (Conventional) | 2 | > 6 hrs | 4.5 | >4 |

Fig. 9

SATELLITE SYSTEM PROVIDING OPTIMAL SPACE SITUATIONAL AWARENESS

BACKGROUND

This application generally relates to satellites, and more particularly, to systems and methods for tracking objects in space.

Characterizing objects in space to determine their status is important. This may include, for instance, detection and resolution of anomalies for spacecrafts, satellites, debris or other space-based objects. In addition, detecting new objects, verifying the position and velocity of existing objects, locating objects that have been maneuvered, and collecting imagery of objects serve a number of military, civil, and commercial needs in terms of avoiding collisions in space and understanding the operating status of satellites.

Space situational awareness (SSA) is knowing the location of objects orbiting the Earth. SSA techniques may include using ground-based observation, such as telescopes. In addition, conventional SSA systems may use a variety of ground-based radio frequency (RF) and optical sensors to provide a "fence" for timely detection and tracking of resident space objects (RSOs) at low-earth orbit (LEO), as well as debris in LEO and other orbits.

FIG. 1 depicts conventional LEO satellite system 100 for space situational awareness. Satellite 110 orbiting Earth 50 may be an upward looking LEO satellite, such as, for example, Midcourse Space Experiment (MSX) and Space-based Visible Sensing Systems (SBSS). In addition, satellite 110 may use visible (VIS) and possibly infrared (IR) sensors to provide timely access to geosynchronous (GEO) RSOs and other objects positioned along Geo belt 120. However, as shown, field of view (FOV) 130 of satellite 110 is quite limited.

FIG. 2 depicts another conventional LEO satellite system 200 for space situational awareness. Satellite 210 may include downward looking sensors, such as Raytheon's Space Tracking & Surveillance System (STSS) sensor, that look past the horizon of Earth 50 to scan GEO arc 220 and other high altitude objects. A problem with such a system is that much of the line-of-sight of each sensor may be blocked by Earth 50. As a result, access portions 230 are much smaller than no access portions 240.

The conventional satellite systems shown in FIGS. 1 and 2, therefore, are not optimal to provide timely access to satellites in either LEO or GEO orbits. In particular, there is a lack of angular diversity to any given GEO object such that, if an object is too close to the apparent position of the sun and/or the object is not illuminated from the vantage of one observer, this will be true of all observers.

Imaging of GEO objects, though, is typically performed using special ground assets and/or by flying sensors in co-orbits with selected GEO satellites. The vast majority of satellites are positioned in GEO orbit at approximately 35,800 km altitude from Earth. Ground based sensors can detect some objects at GEO altitudes, but this required telescope sizes are prohibitive to collect sufficiently high resolution imagery. In principle, ground-based radar systems can collect high-resolution imagery independent of the range to the target using inverse synthetic aperture techniques. However, the extremely small velocity of most satellites at GEO makes this difficult or impossible in practice. Similarly, it is prohibitive to search the large volume at GEO for small objects whose locations are not known a priori. Conventional collection of information from ground-based assets, however, becomes increasing difficult for satellites at this high altitude.

Such observations may use of VIS and IR space based sensors, but may not be able to effectively track small objects in space. Also, ground-based observation must wait for a RSO to fly overhead. This may take many hours.

A VIS or IR sensor positioned in LEO orbit can access and detect many objects in LEO orbits within a few hours. But, it may take almost a day for proper viewing conditions for all objects to occur. In order to use a VIS sensor for observing a target against a sky and/or star-lit background, the target must be illuminated by the sun on the side of object facing the sensor, and the sun and the earth must be away from the sensor's optical axis. This event may not occur for 13 hours or more, from any given point in time. IR sensors do not require solar illumination, but may require cryogenic cooling and/or a larger aperture (as the IR signature of RSO's is relatively weak compared to the VIS illuminated signatures).

A LEO satellite sensor may have access to observe almost any object in other orbits, such as, medium earth orbit (MEO), highly elliptical orbit (HEO) or GEO, within a few hours period. However, small objects located in other orbits may be too faint to detect. For instance, objects in non-LEO orbits will be distant and will have faint signatures compared to objects in LEO orbits.

U.S. Patent Application Publication No. 2008/0081556, herein incorporated by reference in its entirety, discloses a system to rapidly image objects at GEO particularly using radar techniques. It discloses that N satellites could visit all objects in the GEO belt within 12/N hours. Thus, even small objects could be detected and tracked in a timely fashion. Satellite sensors in a retro-GEO orbit can detect small RSOs in GEO orbit and access all objects at GEO within 12 hours. These sensors, however, can see very few objects in LEO, as they must view them in a limited annulus near the Earth, and only when the object is not near a sunlit portion of the Earth.

The Unites States Air Force has discussed plans to deploy a constellation of up to four LEO satellites hosting electro-optic payloads to provide timely detection and tracking information on objects in all orbits. This satellite constellation, however, is limited in guaranteed response time to detect objects at GEO because it takes many hours to search the volume of space. In addition, there can be one to three orbits of latency before a satellite has access to a ground station to report its findings. Further delays can occur because the location of the sun can inhibit detection and tracking for extended periods (e.g. when the sun is behind the object of interest. Even using several satellites in LEO does not solve the viewing problem as all the LEO satellites view an object at GEO at roughly the same geometry. In addition, this planned system is also limited in its ability to detect very small objects at GEO and has no imaging capability.

Thus, conventional space situational awareness techniques have shortcomings.

SUMMARY

In an embodiment, a satellite system for observing space objects includes two or more satellites positioned in an Earth orbit and configured to observe objects in various orbits including those viewed (i) against the Earth's background; (ii) against a sunlit Earth background; and (iii) against a space background; and an electro-magnetic sensor provided on at least one of the satellites that is responsive to electromagnetic radiation having a wavelength that discriminates against substantial reflection of electromagnetic radiation from the Earth's atmosphere to observe the space object.

In another embodiment, a method of observing space objects using a satellite system, the method includes generating commands to at least two satellites positioned in an Earth orbit to selectively observe objects in various orbits including those viewed (i) against the Earth's background; (ii) against a sunlit Earth background; and (iii) against a space background; and generating commands to an electro-magnetic sensor provided on at least one of the satellites the that is responsive to electromagnetic radiation having a wavelength that discriminates against substantial reflection of electromagnetic radiation from the Earth's atmosphere to observe the space object.

BRIEF DESCRIPTION OF THE DRAWINGS

FIG. 1 depicts a conventional LEO satellite system for space situational awareness;

FIG. 2 depicts another conventional LEO satellite system for space situational awareness;

FIG. 9 shows access and latency summary information for various embodiments and conventional systems.

DETAILED DESCRIPTION

Figure 3:
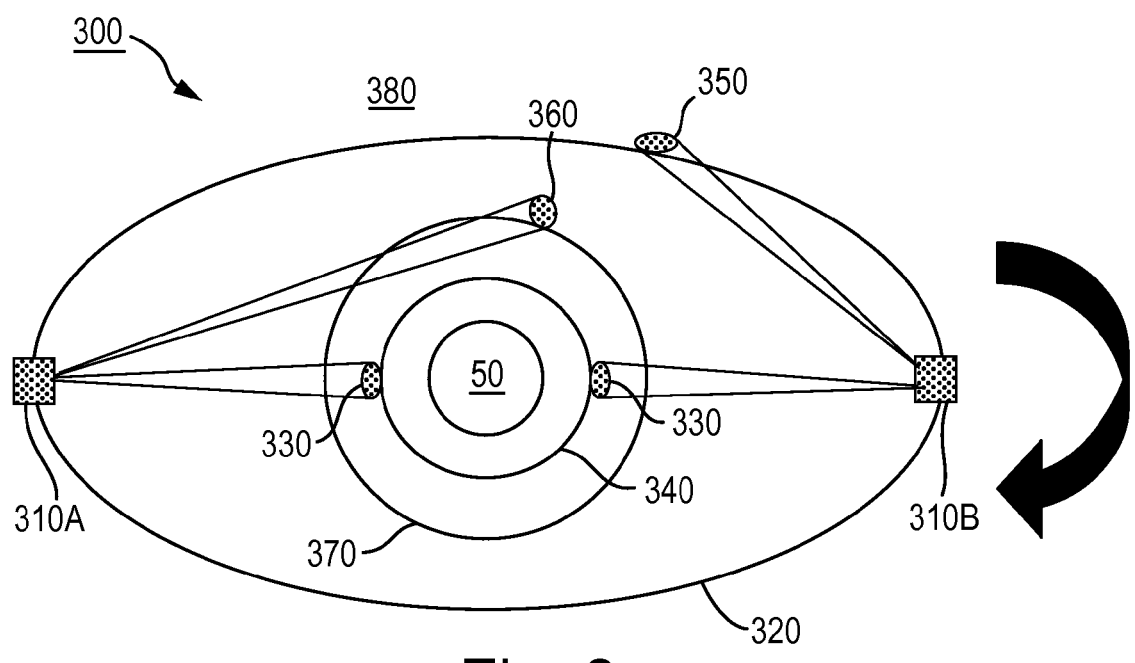
FIG. 3 depicts a satellite system for space situational awareness, in accordance with an embodiment.

Satellite-based detection and imaging systems and methods according to one or more embodiments may employ two or more satellites positioned in an Earth orbit and configured to observe objects in various orbits including those viewed (i) against the Earth's background; (ii) against a sunlit Earth background; and (iii) against a space background. At least one of the satellites may be provided with an electro-magnetic sensor that is responsive to electromagnetic radiation having a wavelength that discriminates against substantial reflection of electromagnetic radiation from the Earth's atmosphere to observe the space object.

The satellites may be positioned in various orbits to detect, track, and/or image various space-based objects. These orbits may include, but are not necessarily limited to, LEO, GEO, or GPS orbits. These orbits may be especially important for space cyber warfare, anti-satellite countermeasures and foreign satellite warfare.

In one implementation, the satellite system may be positioned in a retrograde (or "retro") orbit about Earth. A retrograde orbit is motion in an orbit opposite to the usual orbital direction and which may be inclined at an angle of up to 180 degrees with respect to the equator to Earth. Retro orbits share one primary characteristic, namely, they fly approximately opposite to the "forward" orbits of satellites in or near an orbital plane. An orbital plane is a volume of space near a given altitude and inclination from the equator. To achieve retrograde orbit, the satellites may be boosted to an altitude of approximately 35,300 km and a tangential velocity of approximately 3.05 km/sec such that the circular orbit is opposite the direction of the Earth's rotation. Flying in this fashion, the average velocity of the satellites relative to resident objects in GEO orbits should be slightly more than 6 km/sec. This enables the satellites to pass within 500 km of each object, on average. Retro orbits also provide very high relative crossing velocities that enable rapid mono-static or bi-static radar imaging. See, e.g., U.S. Patent Application Publication No. 2008/0081556, mentioned above. Retro orbits at other similar altitudes work well for the detecting objects while the close approach of about 500 km is enabling for the collection of imagery.

Prograde (or "pro") orbits may also be used. A prograde orbit is an orbit which moves in a circle around the center of the Earth in the same direction as the rotation of the Earth (inclination O-90 degrees). Prograde GEO orbits have inclination of about 0 degrees and retrograde GEO is inclination of about 180 degrees.

In one embodiment, the satellite system may include two or more satellites that together have instantaneous access to any space-based object (i.e., without a wait). This greatly improves the ability to obtain more timely information regarding the detection and tracking of various space-based object in orbits. Timely access may be needed to resolve anomalies, acquire newly launched satellites, reacquire satellites that have maneuvered, detect co-orbital intruders, and to ensure collisions are avoided. This enables rapid imaging of satellites and/or resident space object at various orbits. For instance, the mean time to detect a space target may be a little as 20 minutes.

The satellite system may provide frequent revisit and imaging of geosynchronous resident space objects located at all longitudes employing a minimum number of satellites, as well as detection and tracking of satellites in all orbits. For example, the largest plane of satellites is the GEO Belt. Here, hundreds of satellites fly at approximately 35,800 km from Earth at a zero degree inclination. The second largest plane is the LEO sun-synchronous (SS) satellites. At this plane, satellites fly at approximately 800 km and 99 degrees inclination, and may be used for supporting meteorology, imaging, remote sensing, and other missions. Other satellite constellations, such as, for example, the global positioning system (GPS), IRIDIUM®, and GLOBALSTAR® use multiple planes with as many as eight satellites in each plane.

The use of retro orbits provides extremely timely access at short range to objects in the "forward" orbit (i.e., average revisit time is about P/4N, where P is the period of the orbit, and N is the number of observer satellites). This also enables surveillance of the space near objects for debris or intruder satellites.

FIG. 3 depicts satellite system 300 for space situational awareness, in accordance with an embodiment. Satellite system 300 may be configured in several ways. The characteristics of the orbits, such as the number of orbits, the inclination of each orbit, the number of satellites in each orbit and the altitude of the satellites, may be tailored to minimize the time it takes to achieve line-of-sight access, especially to sunlit RSOs, and particularly in the heavily populated GEO belt and sun-synchronous LEO orbits. While two satellites are shown, it will be appreciated that one or more additional satellites might also be provided.

As shown, two satellites 310A, 310B are positioned in retro-GEO orbit 320 about Earth 50 and configured to observe objects in all orbits. This may also be beneficial for image objects at GEO. Satellites 310A, 310B, may be equally spaced apart in orbit, as shown in FIG. 3.

Figure 3A:
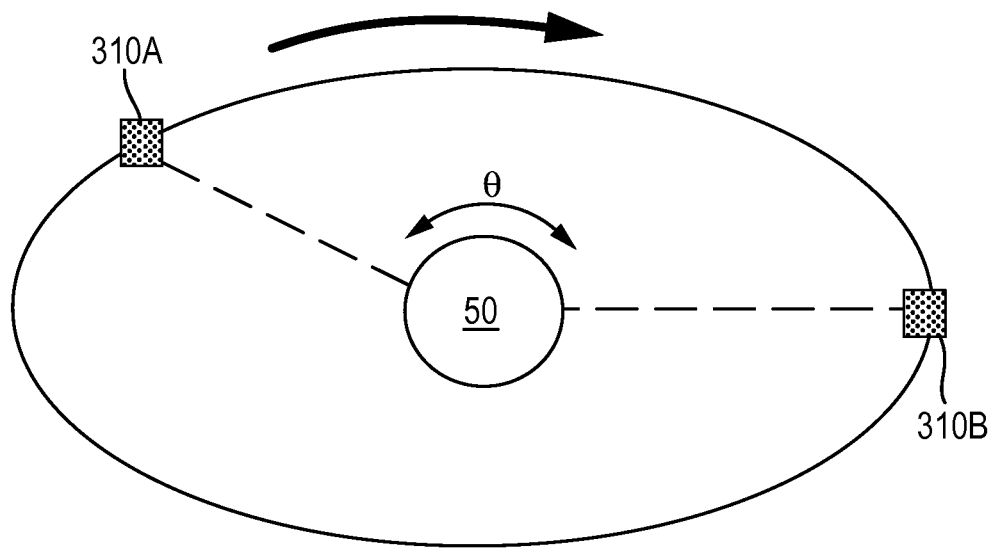
FIGS. 3(a) and 3(b) depict satellite systems having two and three satellites respectively, in accordance with embodiments.

However, for a two satellite constellation, with each satellite spaced apart at 180 degrees from each other, there may be no line of sight between satellites 310A, 310B because Earth 50 is in the way. Therefore, as shown in FIG. 3(a), a two satellite constellation, each satellite 310A, 310B may be positioned apart by at angle Θ, which is half a GEO arc less a certain angle. For instance, this may be about 18 degrees, such that the two satellites 310A, 310B would be positioned apart at angle Θ of 162 degrees to provide line of sight to each other.

Figure 3B:
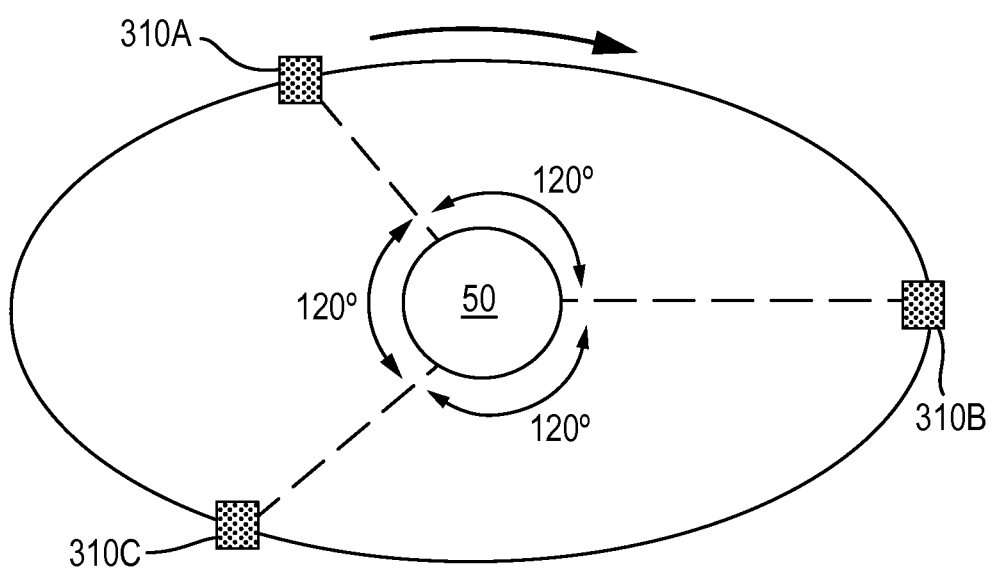

For three of more satellites, line or sight between satellites should not be a problem. Thus, if there are three or more satellites (e.g., in either prograde or retrograde orbit) they may be spaced equally (i.e., 360/N degrees). For example, as shown in FIG. 3(b), three satellites 310A, 310B, 310C are equally spaced at about 120 degrees apart from each other.

In this fashion, satellites 310 may have a line-of-sight to about 100% of objects in orbit at altitudes of 300 km or greater and to each other. This small constellation has continuous access to all sunlit LEO, sunlit GEO, and other orbiting RSOs. LEO targets that are not currently sunlit will become sunlit within half an orbit (45-60 minutes). On the other hand, GEO targets remain sunlit about 99% of the time. The two satellites can communicate with each other at all times. And at least one satellite has line of sight to the United States at most times. When there is no line of sight to the U.S. the delay until such a line of sight is available is less than one hour. This means a single ground site can be utilized with very low reporting latency.

Objects 330 in LEO orbits 340 may be observed with Earth 50 as the background or adjacent to the field of view of the tracking sensor. On the other hand, object(s) 350, 360 in other orbits 320, 370 may be observed with space 380 as the background.

One or more of satellites 310 may be equipped with one or more sensors for surveillance and other sensing. Such sensors may use one or more spectra of the electromagnetic spectrum for sensing. These may include IR, VIS, ultraviolet (UV) and radio frequency (RF) portions of the electromagnetic radiation spectrum. Of course, other spectra might also be used such as radio frequency, including microwave. For surveillance, VIS, and UV are generally the most cost effective. IR, for instance, may not be very effective for imaging objects which are not sun-lit against a space background. A retro orbit satellite constellation may be able to pass within range, and to image many other satellites. IR, VIS, or RF could be beneficial for this imaging mission. System 300 rapidly provides line-of-sight viewing of illuminated targets and objects in any orbit and provides near constant access to one or more U.S.-based ground stations for reporting of data. It is may also be possible to provide geometries favorable for both electro-optical (EO) and radar imaging. This architecture may also use space-based, rather than conventional ground platforms.

Satellites 310 pass near to (revisit) every assigned GEO orbital slot at roughly 6-hour intervals (i.e., approximately 12/N for N satellites) and can scan the intra-slot volume for new objects. The average relative velocity of the satellites to resident objects in GEO orbits may be slightly more than 6 km/sec passing within 500 km of each GEO RSO, on average. Much closer passes though could be implemented, if desired. Satellite system 300 may be used to verify the location of objects whose orbits are known or that have maneuvered from known orbits.

In one implementation, an electro-optical sensor satellite payload may include a two-dimensional focal plane that is configured to sense radiation between 200-1000 nm. It may also be configured to filter the radiation to be as narrow as approximately 200-300 nm so that it can detect sunlit objects with Earth in or near the field-of-view. This is advantageous because the Earth's atmosphere absorbs almost all radiation in this band, scattering a very small amount back into space.

Figure 4:
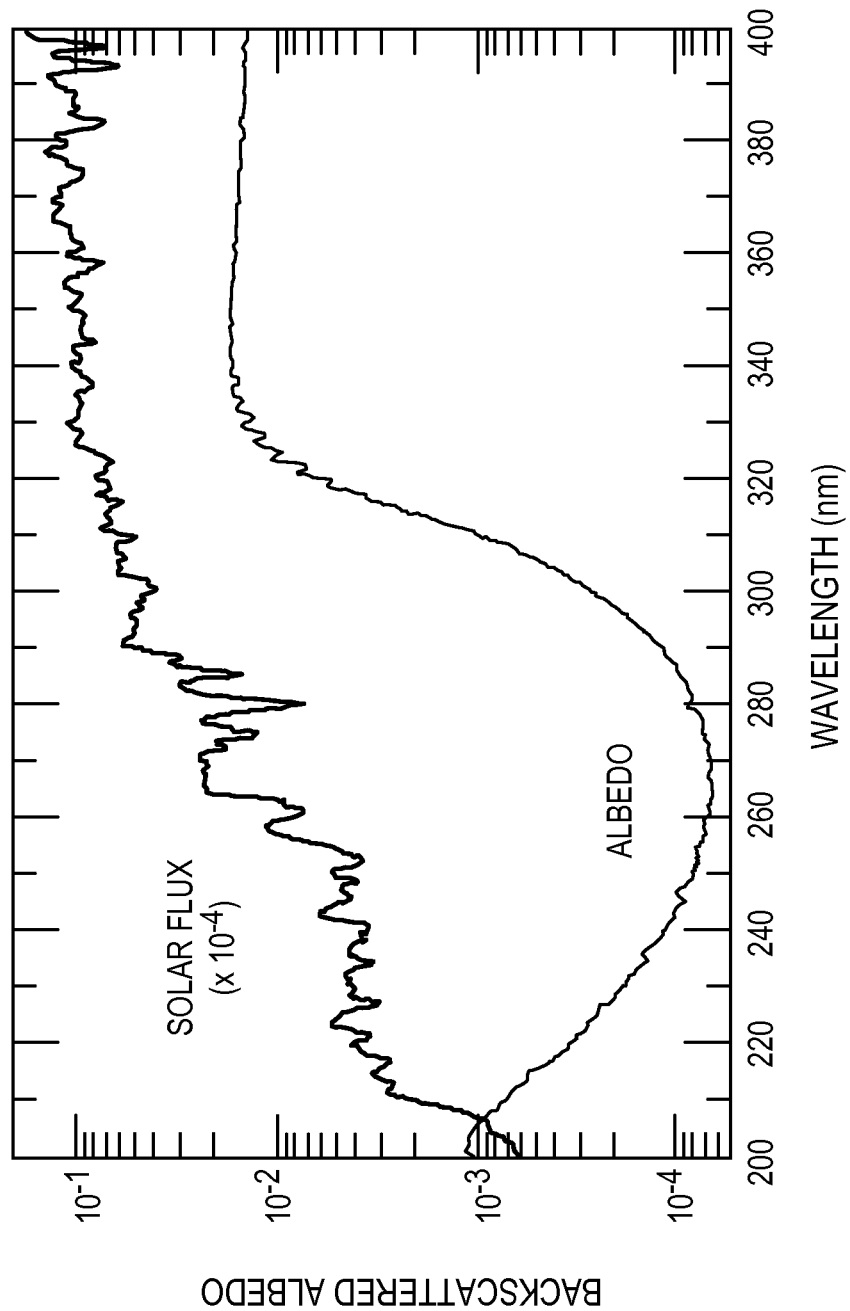
FIG. 4 is a plot of the effective Albedo looking down on the Earth.

FIG. 4 is a plot of the effective albedo looking down on the Earth for various wavelengths of electromagnetic radiation between about 200-400 nm. Albedo may be defined as the ratio of diffusely reflected to incident electromagnetic radiation. It is a unitless fraction. The albedo of an object is the extent to which it diffusely reflects light from light sources. In this case of orbiting Earth, the Sun is the primary light source. As FIG. 4 shows, the albedo drops off slowly at other viewing angles in accordance with the Rayleigh scattering function. The satellites may utilize a spectral band where the albedo is minimal compared with solar flux. This may occur roughly about 200-300 nm.

Figure 5:
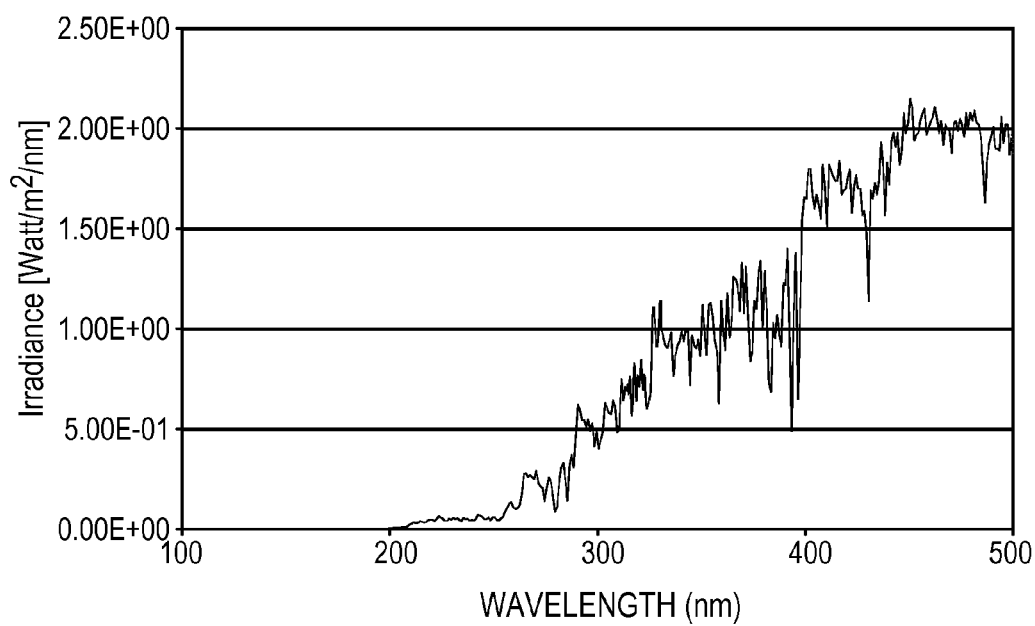
FIG. 5 is a plot of exoatmospheric solar irradiance.

FIG. 5 shows a plot of exoatmospheric solar irradiance. The plot depicts solar illumination as a function of wavelength outside of the Earth's Atmosphere. As shown in FIG. 5, there is ample solar irradiance for targets above the atmosphere, increasing exponentially in the region above about 300 nm.

In one implementation, satellite sensors may be configured for sensing electromagnetic radiation (light) in solar blind ultraviolet (SBUV) spectrum, having wavelengths between about 200-300 nm and more particularly, 240 to 285 nm. This spectrum may be selected to improve observing target object with respect to their background as viewed, and enable observations of LEO targets from a GEO sensor or high LEO sensor.

Figure 6A:
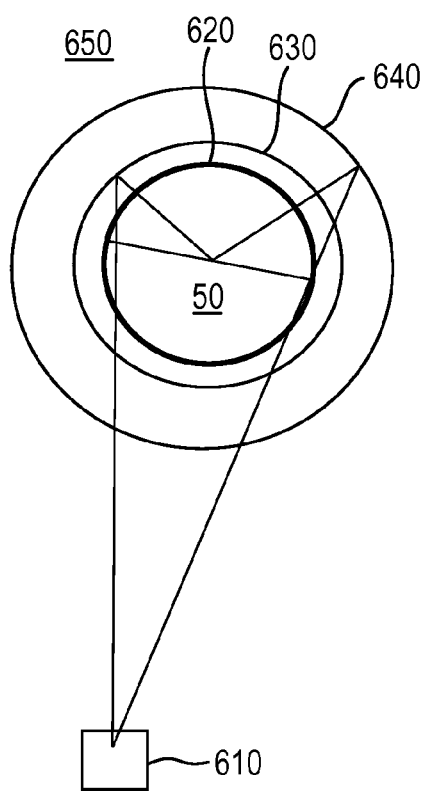
FIGS. 6(a) and 6(b) depict object observations using the satellite system for space situational awareness, in accordance with embodiments.
Figure 6B:
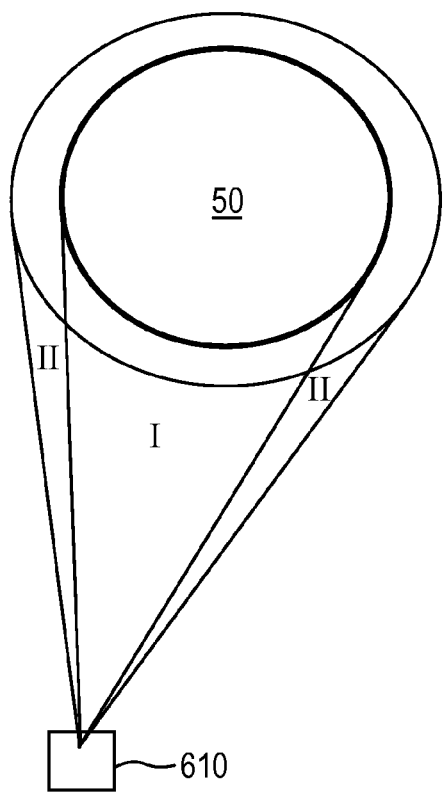

FIGS. 6(a) and 6(b) depict object observations using satellite system 300 for space situational awareness, in accordance with an embodiment. FIG. 6(a) shows that one satellite sensor 610 may see objects past the horizon of Earth 50. For example, sensor 610 may scan expected orbital tracks 620, 630, 640 for objects viewed against Earth 50. This satellite group of constellation may be scheduled to observe objects in all orbits, as needed. Sensor 610 may stare at Earth 50 or at inertial space 650 (e.g., a space background), as necessary. Staring at the Earth or at the space background enables the detection and tracking of objects without a priori information on their trajectories.

Objects flying at approximately 300 km will be sunlit at least 55% of the time and become sunlit within 45 minutes from any given point in time. The percentage of solar illumination generally increases with altitude and reaches 66% of maximum at 1100 km (and become sunlit within no more than 40 minutes). And, solar illumination will reach 99% of maximum at GEO altitude. One of the two satellites may be configured to have a line of sight to a sunlit object with the sun far from its line-of-sight within a short time interval. Sensors may include photoreceptor arrays, charge coupled devices (CCD), or other optical detectors that are capable of imaging.

FIG. 6(b) shows one satellite sensor 610 scheduled to observe targets both against Earth 50 and adjacent Earth 50. In one implementation, the SBUV spectrum may be selected for viewing against a sunlit earth (region I) or when the adjacent earth is sunlit (such as region II). Otherwise, stray light may overwhelm the target intensity. On the other hand, VIS and/or near infrared (NIR) spectral bands could be selected for sensing targets when the background is inertial.

For viewing a target object against Earth 50, a "target following" mode keeps the sensor following the target while enabling the use of a sufficiently small pixel footprint to limit background photon noise.

Targets are best viewed away from the sunlit earth, but should be sunlit themselves. Scheduling may be performed either on-board and/or on the ground so that the most favorable geometry is provided. When viewing an object away from the sunlit earth, then the widest possible spectral band may be employed. On the other hand, when viewing targets with the sun-lit Earth in the background or adjacent to the line of sight, then the SBUV spectral band may be employed.

When viewing a target object against the Earth, the highest sensitivity may be achieved when the target energy is captured in one or a more pixels of the satellite sensor. The pixels should be sized small enough such that background photon noise does not overwhelm the target signal. Typically, the background radiance in the 200-300 nm band is between about 2 and 5 $\mu W/cm^2/Sr/\mu m$.

There may be various trade-offs in design parameters to minimize detectable target, detection time, search rate, and sensor size, cost and/or weight considerations. For example, a sensor with a 75-cm aperture with a focal ratio (F/#) of 4.5, employing a focal plane, such as, complementary metal-oxide-semiconductor (CMOS) or silicon PIN focal plane with a pixel pitch of approximately 8 microns, can provide a pixel projected to be about 50 m×50 m. W. A 1024×1024 pixel focal plane array (FPA), for instance, may be configured to observe a region of approximately 50 km×50 km, instantaneously.

For a sensor with a 50 m×50 m pixel, a satellite target is viewed as a point source, whose signal is blurred across one or pixels on the focal plane. A target having an effective area (the product of reflectivity and cross-sectional area) of 1 meter-squared produces roughly the same number of detected photo-electrons per detector as the background (which has albedo of ~1e-4 as shown in FIG. 4). As the noise component of the background is proportional to the square-root of the background level this is a good result. The scheduler will set integration time such that the target will be viewed for sufficient time to provide a signal-to-noise ratio that is sufficient for detection.

A higher SNR may be obtained with longer i"tegration times, brighter targets, or alternate sensor design.

For objects viewed away from Earth, on the other hand, a detection mode that uses inertial stare (stare at fixed star background] may be used This satellite sensor design may have higher SNR for objects observed in the VIS/NIR, even at 80,000 km across the GEO arc. The same satellite sensor can provide high-resolution imagery of objects at GEO during the close passes. At about 40 km range, the instantaneous filed of view (IFOV) of a pixel may be about 10 cm.

It is noted that the above calculations do not include the effect of glints or small flashes of lights. In fact, RSOs often produce small, bright glints for brief periods of time. Glints may add to the signature, but may not relied upon for detection. Other size pixels can be employed to optimize coverage rate versus minimum detectable object.

The satellite sensor payload may also be designed to sense targets anywhere along the GEO belt. The satellites have highly divergent views of every location in the GEO belt. This assures that one or both of the satellites may be able to observe a sunlit object at any longitude (except during eclipse, which occurs 1% of the time or less and lasts less than 75 minutes).

GEO satellites have much shorter latency to any number of fixed ground stations than conventional systems. Ideally, one ground station would be in view of at least one of the satellites almost continuously with short outages. two or more ground stations could be located to provide continuous communications access. These ground stations may be based in the United States. Adding one or more additional GEO satellites will ensure that the constellation always has access to a ground station and would improve the diversity of viewing conditions for RSOs. For instance, a third satellite could be used to search for LEO objects and could have a much smaller sensor payload.

Some implementations may utilize an earth staring mode. In an earth staring mode, a target may move through an effective sensor pixel area in less than 1/50 of a second. Sensor frames thus may be collected at about 50-100 Hz, and then are digitally shifted and added to test for targets moving in any selected direction. This mode may require faster frame rates and greater processing complexity, but it may detect targets moving in any direction. In certain implementations, this mode searches along or near a specified direction.

This mode may be included in parallel with the embodiment shown in FIG. 3, and might be better for searching large volumes of space for unknown targets.

Figure 7:
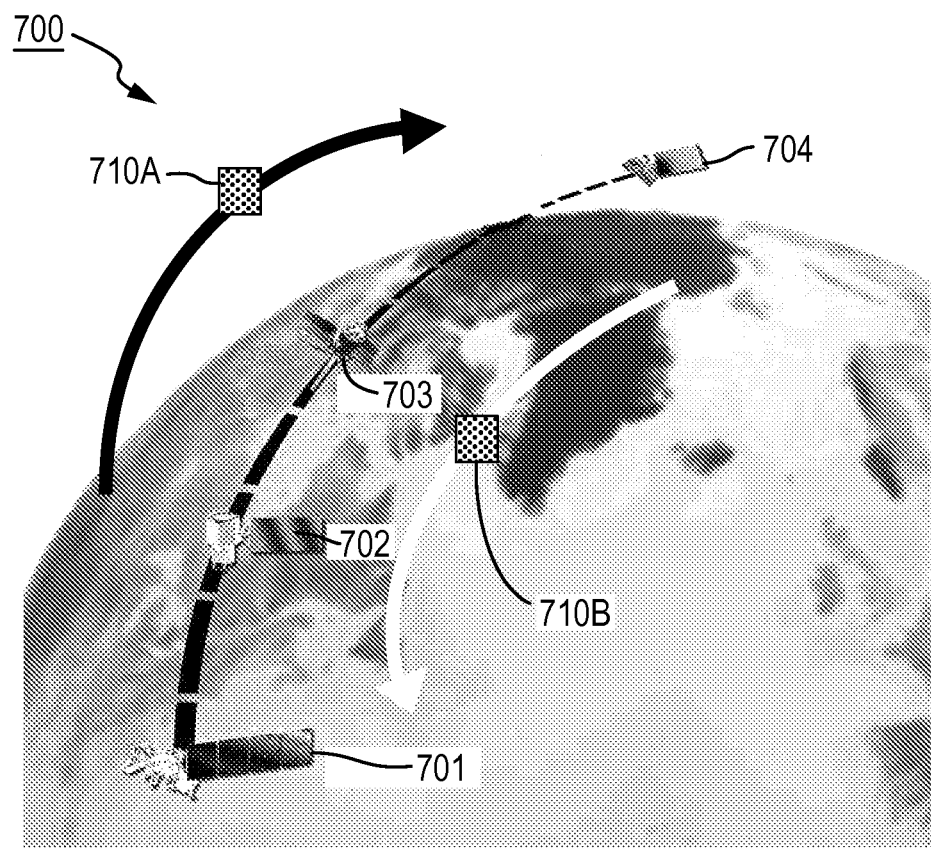
FIG. 7 depicts a retro sun-synchronous orbit (R-SS) satellite for space situational awareness, in accordance with an embodiment.

FIG. 7 depicts another satellite system 700 for space situational awareness in accordance with an embodiment. Satellite system 700 may include satellite 710 which flies in a retro sun-synchronous (R-SS) orbit. This orbit may be approximately 82 degrees in inclination. In one implementation, satellite 710 may fly at the minimum stable altitude (approximately 400 km) and can look upwards and sideways at LEO objects. In another implementation, satellite may fly at approximately 1400-1600 km and looks down at LEO objects. This implementation may use a similar spectral selection methodology and sensor concept (but much smaller) as used in satellite system 300 shown in FIG. 3. These objects may include, for instance, satellites in orbit today, such as, U.S. and foreign weather, science, and commercial imaging satellites 701, 702, 703, 704.

In some implementations, satellite 710 may be added to one or more other satellite systems disclosed herein, in an up- or down-looking implementation).

Satellite 710 may pass close to all sun-synchronous objects approximately every 45-60 minutes. Yet, at least every other pass is in sunlight. Down-looking implementation 710A can also search for debris at altitudes below the stable orbit limit. On the other hand, up-looking implementation 710B may be limited to viewing such debris near the Earth's limb at much longer ranges.

These implementations may provide frequent access to all LEO objects, though not as frequent as for sun-synchronous objects. However, the advantage of adding the retro sun-synchronous orbit satellite is to reduce the aperture on the retro-GEO satellites to as little as 5 cm (or slightly larger, for example, if standoff imaging is desired) while preserving the ability to detect objects in all orbits. Additional retro-satellites may be added to one or more planes of large constellations (e.g. GPS). For example, an additional retro-SS satellite may be positioned in an orbit with inclination of roughly 82 degrees. It may fly at either an altitude of about 400 km or an altitude of about 1400 km.

In other implementations, one or more satellites may fly at approximately 180 degrees inclination at the average altitude of a large constellation. Each of these satellites may have numerous close passes to all satellites in the constellation and to any intruders or debris co-orbiting with a plane. Slight adjustments in altitude can be made to ensure the retro-satellite samples the entire constellation, avoiding any synchronicities, and to ensure there are no collisions with debris located close to an active orbit.

Figure 8:
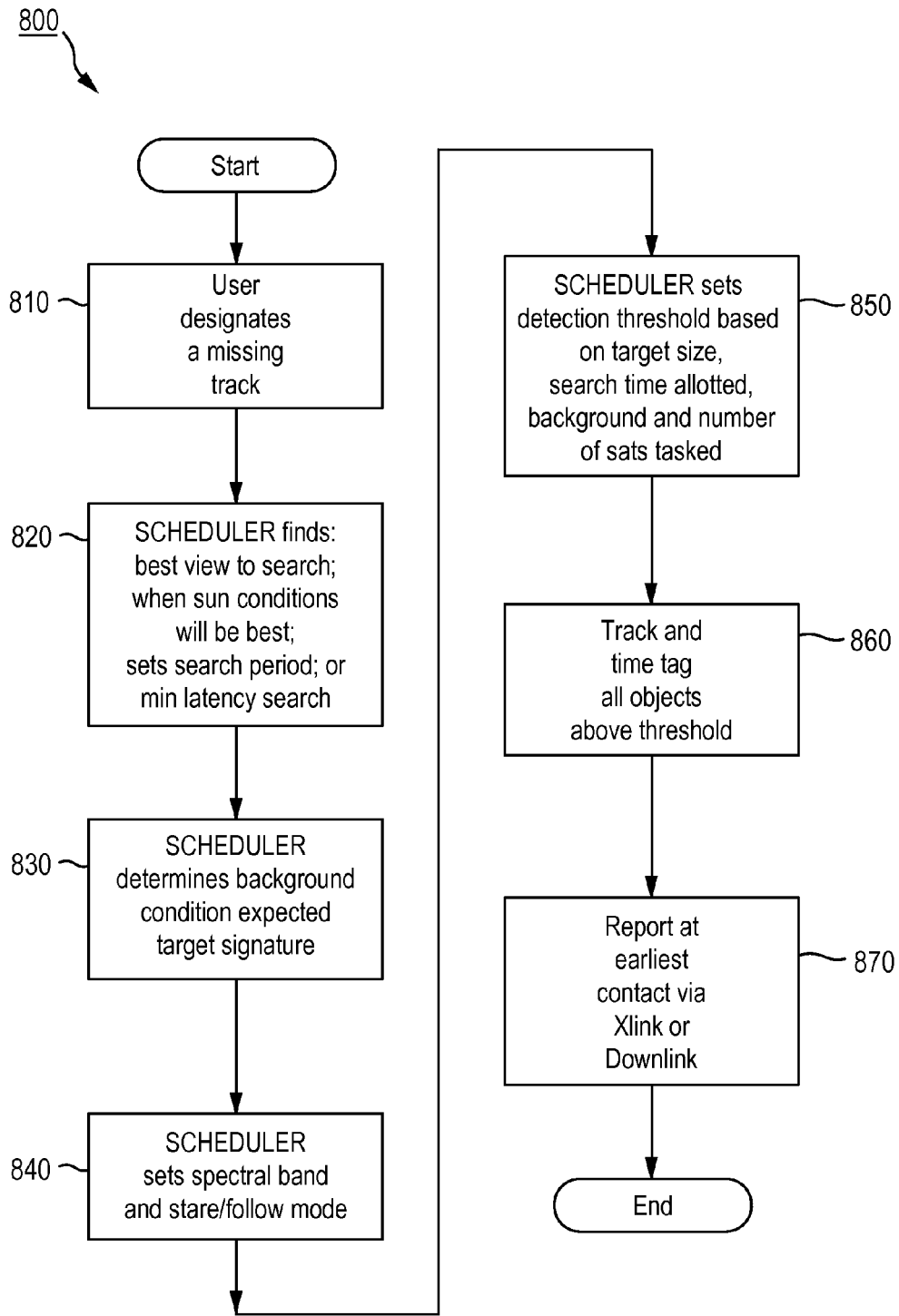
FIG. 8 shows exemplary method for scheduling a satellite for space situational awareness in accordance with an embodiment.

FIG. 8 shows exemplary method 800 for scheduling a satellite for space situational awareness according to an embodiment.

Scheduling may be performed by using one or more processors, which may be generally referred to as a "Scheduler." The processors may be located on-board the sensor platform of the satellite(s) and/or at ground-based positions. In some implementations, the processors may be dedicated hardware, like a application-specific integrated circuit (ASIC) or field-programmable gate array (FPGAs). For different methods, the programming and/or software may vary.

In step 810, a user may designate an object for tracking. In some instances, the exact location of the object may be presently unknown. A "missing track" is a track that was previously known and some asset has looked for the target along this track and it was not found. The previous track may have been incorrect or the target object may have maneuvered or strayed from its orbit. The user may be ground-based on the Earth, although, it is contemplated that the user could be space-based or extraterrestrial, for example, in a space-based vehicle, or space-station.

Operation in this mode, assumes that the velocity vector from the old track is relatively close to whatever new velocity vector the target has. When velocity is approximately known, the system may employ a "target follow tracking operation," its most sensitive method. In target follow tracking the sensor's line of sight is scanned to match the expected velocity vector. Targets moving at or near that angular rate will be imaged on a single pixel or a small group of pixels, increasing approximately linearly in signal level while noise will accrue at a much slower rate.

The request to search for a missing track may include the equivalent spherical target area, the estimated position (known to be wrong), a user selected detection threshold (e.g. threshold to noise ratio of 4), and/or the last track velocity vectors.

Continuing to step 820, the Scheduler finds the optimal viewing conditions for the target. Step 820 refers to the scheduler selecting the satellite with most favorable conditions to detect the missing target in the shortest time. If more than one satellite in the present invention can see the expected target area then it will be the case that for a given equivalent spherical area that one of the satellites can achieve greater signal-to-noise ratio than the other. The signal to noise level is a combination of the fraction of the target that is illuminated, as seen by each satellite, the range to the target from each satellite, the spectral band employed (which is itself a function of the background viewed behind the target by each respective satellite), and the inherent noise level of the sensors on each satellite. To find the missing track the following steps may be performed by the Scheduler:

a. Determine a search region ahead of and behind expected track position.
b. Determine where in the search region the target is sunlit.
c. If the entire extent of the region is sunlit then:
 1. Determine the target solar phase angle (for the target at altitude) and the background for a grid within the search region for each sensor that has line-of-sight (LOS) to the region. The backgrounds include space, space near lit earth, lit earth, or non-lit earth.
 2. Determine whether sun is within a "keep out" region for each sensor.
 3. Estimate the signal to noise level vs. integration time for each spectral band on each sensor, given the respective target phase angle and background. The satellites can see any sunlit target, but the integration time depends on target phase and background. When the sun is within the "keep out" region, the SNR per unit time is zero.
 4. If the SNR per unit time of all sensors is zero then the Scheduler determines at what time in the future the SNR per unit time will be non-zero. The Scheduler reports this delay to the user and the system can conduct other tasks or be idle during the delay period. If SNR per unit time is not zero or delay period has occurred, then continue to next step.
 5. Determine the search time using the sensor with the highest signal to noise level per unit time.
 6. If the search region will remain sunlit during time then the sensor with the highest signal to noise level is tasked to "target follow" across the search region using the spectral band that provides the highest SNR per unit time.
 7. Scheduler tasks this sensor to set its spectral band for highest SNR per earlier computation and determines the integration time needed for SNR to reach the user supplied threshold.
 8. Optionally, all sensors with the line of visibility (LOV) to a search region may be tasked to the target. If two or more sensors are tasked to a particular region, the detection threshold may optionally educe the detection threshold for each sensor and require that each sensor detect the target.

In step 830, the Scheduler determines the background conditions expected target signature. The scheduler may determine one or both of search regions ahead of and/or behind expected track position. And, it may also determine where in the search region the target is sunlit.

In step 840, the Scheduler sets the spectral bands and sensing modes for tracking. For instance, the sensing mode may include one of (i) target follow and (ii) staring modes, discussed below.

Target Follow Mode

If only some part of the search region is sunlit, then the system may perform a target follow for the entire region, and may ignore any detections from the non-illuminated portion.

The Scheduler determines the SNR in each spectral band for each sensor that has line of sight to the illuminated portion of the orbit. The Scheduler may then select the spectral band with the highest SNR. If the target is not detected in the search region, then the target may be presumed to be in an unilluminated region. Any target in the unilluminated region will become illuminated within about 45 minutes for LEO or about 72 minutes or less for GEO. The system propagates the orbits in the unilluminated region ahead to the time when the target will be sunlit.

The system computes the SNR per unit time for the each sensor with line of sight to the predicted illuminated region and tasks the sensor with the shortest search time to target follow that region.

If the search region is completely unilluminated, the system predicts ahead when the target will be illuminated.

In a target follow mode, if the entire extent of the region is sunlit then the Scheduler may be configured to:

a. Determine the target solar phase angle (for the target at altitude) and the background for a grid within the search region for each sensor that has line-of-sight (LOS) to the region. The backgrounds include space, space near lit earth, lit earth, or non-lit earth.
b. Determine whether sun is within a "keep out" region for each sensor.
c. Estimate the signal to noise level vs. integration time for each spectral band on each sensor, given the respective target phase angle and background. The satellites can see any sunlit target, but the integration time depends on target phase and background. When the sun is within the "keep out" region the SNR per unit time is zero
d. If the SNR per unit time of all sensors is zero, then the Scheduler may determines at what time in the future the SNR per unit time will be non-zero. The scheduler reports this delay and the system can conduct other tasks or be idle during the delay period. If SNR per unit time is not zero or delay period has occurred then continue to next step.

e. Determine the search time using the sensor with the highest signal to noise level per unit time. Search time may be determined by the amount of time expected to reach a given signal-to-noise ratio. This level is selected by the user. Signal to noise ratio may increase somewhere between the sqrt(search time) and linearly with search time, depending on the individual sensor and background characteristics.

f. If the search region will remain sunlit during time then the sensor with the highest signal to noise level is tasked to "target follow" across the search region using the spectral band that provides the highest SNR per unit time.

g. Scheduler tasks the sensor to set its spectral band for highest SNR per earlier computation and determines the integration time needed for SNR to reach the user supplied threshold;

h. Optionally, all sensors with a LOV to a search region may be tasked to the target. If two or more sensors are tasked to a particular region, the detection threshold may be optionally reduce for each sensor and require that each sensor detect the target.

Staring Mode

A staring mode can be substituted for target follow mode. In the staring mode, an inertial stare may be used for space background and earth stare for earth background.

The staring mode may take slightly more time to detect a given target than the target follow mode, but targets moving at any speed and in any direction across the field of view can be detected. It also may enable multiple targets to be detected simultaneously. When space is the background, an inertial stare may be used. Stars are removed either because they are stationary and targets are moving, or by catalogue location. For targets viewed against the earth a fixed earth stare is employed.

Staring mode may be used to search volumes of space. The user may supply a minimum target size for the volume to be searched and a minimum velocity relative to inertial space. Targets viewed against the earth generally will have high angular rates. SNR per unit time may be a function of target size, target solar phase angle, background, and target angular rate. Since targets move across each sensor's field of view, their signal spans several detector elements. A processor can recover much of this signal, but more noise from electronics may be introduced into the final result than in Target Follow Mode.

In staring mode, the following steps may be executed:

a. Determine whether the sun is within "keep out" region for each sensor. A sensor that views the target when the sun is within the keep out region has SNR per unit time of zero.

b. For each volume search, the Scheduler can determine the SNR per unit time for each spectral band of each sensor for the minimum target and relative velocity.

c. The Scheduler then tasks the sensor with the highest SNR per unit time, using the spectral band and type of stare for that spectral band to provide the highest SNR per unit time.

d. If all sensors have zero SNR per unit time, the Scheduler determines the delay for each sensor until SNR per unit time is not zero. The shortest delay is reported and the sensor with the shortest delay is tasked to the search region after the delay interval passes.

e. Once tasked, the sensor removes stationary targets and reports all moving targets above minimum velocity.

f. The sensor is tasked to either repeat these steps or begin again searching a new volume.

In step 850, the Scheduler sets the detection threshold of each satellite sensor based on the target size, search time allocated, background, and/or the number of satellites tasked, as were determined above in step 840.

Next, the satellite(s) having been instructed by the Scheduler, in step 860, to track objects above the threshold.

Lastly, the satellite(s) report, in step 870, earliest target contact, to the user. Communications between the satellite and the ground station may be performed, for example, using known cross-link (Xlink) or Downlink technologies. The method subsequently ends.

The satellite systems and methods disclosed herein may be optimized by sensor placement to maximize the solid angle of orbital space that can be viewed with favorable target solar phase angle and low background level. Targets viewed against the Earth may be harder and more time consuming to detect, but only targets in LEO orbits will be viewed against the Earth. The solid angle of orbital space to be viewed against the Earth is a small fraction of the total search volume.

The system may combine the above scheduling rules with optimal sensor locations to minimize the search time, including delay in communications latency that will occur for detecting and reporting on any target. This may provide advantageous benefits over conventional ground and LEO based sensors that have substantial delays in conducting searches of many targets due to targets being in keep out regions of long duration, delays in having line-of-sight to a given target, poor solar phase angles, and communications latency in reporting detections to a ground-based authority.

A method of observing a space object using a satellite system includes generating commands to one or more satellites positioned in an Earth orbit; and generating commands to an electro-magnetic sensor provided on the satellite(s) that is responsive to electromagnetic radiation having a wavelength of approximately 200-300 nm to observe a space object. The commands may be generated automatically, or by a user from a tracking station (whether ground-based or space-based).

FIG. 9 shows access and latency summary information for various embodiments compared to conventional systems.

Three embodiments described herein are depicted along the top three rows of the table. The bottom two rows depict "conventional" LEO satellites, having two satellites and differing in orbit: one plane and two planes.

FIG. 9 also shows the worst communication delays, maximum outage expected at the worst time of year (e.g., Equinox for GEO orbit), and "bad case" (95% case) latencies for each. These configurations assume a single ground station located in the U.S., but it could be any location between 15 and 50 degrees of latitude. The probability is determined by examining random times of day such that the sun and the satellites are at differing locations. The results may be somewhat better at times closer to winter or summer solstice, but the relative performance rankings do not change.

The conventional LEO satellite configurations have many more times of day where they either have delays/latency due to the angle between the satellite-target-sun and/or due to line-of-sight to the ground station in comparison with the top three embodiments.

A 2-Retro embodiment (i.e., comprised of two satellites in retro orbit) may be positioned and equipped such that it can see objects in orbit at an altitude of 300 km or greater. A significant improvement in latency is realized with this embodiment. A prograde two satellite constellation (not shown) may also have better performance than the conventional 2-LEO configurations, but may have longer search latency than the retrograde.

If three or more satellites are employed they can communicate with each other at all times and also any single ground station. They also have even better viewing geometries. For instance, they may be able to detect objects that are not in the Earth's shadow (which occurs less than 1% of the time).

In a 3-Retro embodiment, three satellites are equally or nearly equally phased in orbit. This reduces communications latencies to essential zero and guarantees that every object in GEO orbit that is sunlit presents a useable solar phase angle to one or more viewers.

In a 3-Pro embodiment, three satellites are positioned in a prograde orbit, and have almost as good performance as the 3-Retro embodiment. Three prograde satellites have zero communications latency and a probability of latency similar to two or three retrograde satellites Compared with the conventional LEO system, these systems offer significant improvement in communication efficiency. Although, retrograde orbiting satellites may offer better viewing angles compared to prograde in some instances. In addition, retro orbits may be better for enabling the detection of all very small objects (e.g., approximately 1 cm) at or near GEO objects and also can support imaging of objects at or near GEO orbit.

A further advantage of the disclosed embodiments is that they may take much less time than conventional systems to search for any particular object. The total interval of time includes receiving of orders from the ground (which can be delayed for prior systems due to lack of line of sight from ground station), searching for an object under favorable conditions (including range to object and availability of a solar phase angle that allows detection). This lower interval capability is due to the unique orbits and the combination of sensor, spectral selection, and scheduling) to select the best satellite and selection of proper spectral band to see against whatever background is present. These systems have much faster search response than the conventional LEO satellite system.

Other benefits include close passes to objects in GEO for imaging, close range to objects in GEO and the region between GEO orbital slots to search for very small objects (e.g., centimeter size or smaller) and debris. These may complement ground-based sensors which can already see most objects in LEO, large and small, with fairly low latency. In addition, while the systems described herein can see objects in LEO, they may also be used to search for other object which may not be timely for the ground assets to track. Further, the system may be configured to immediately see a LEO sunlit object (although it may need to additional time to process and/or detect an object).

While Earth orbit is discussed above, it is contemplated that orbits about other bodies (e.g., planets, moon, stars, etc.) could similarly be performed.

These disclosed systems and methods may overcome various limitations in the art, including among others, bringing sensors closer to the largest volume of targets, diversifying the viewing geometries, and expanding the use of sensor technology to access objects in all orbits with a mean time of less than one hour.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A satellite system for observing space objects comprising:
two or more satellites positioned in an Earth orbit and configured to observe objects in various orbits including those viewed (i) against the Earth's background; (ii) against a sunlit Earth background; and (iii) against a space background; and
an electro-magnetic sensor provided on at least one of the satellites that is responsive to electromagnetic radiation having a wavelength that discriminates against substantial reflection of electromagnetic radiation from the Earth's atmosphere to observe the space object;
wherein the satellites are positioned in a retrograde sun-synchronous orbit having an inclination of approximately 82 degrees;
wherein the altitude of at least one of the satellites is approximately 400 km so as to observe space objects upwards and sideways in low earth orbit and at least a second one of the satellites is approximately 1400-1600 km so as to observe space objects downward in low earth orbit.

2. The satellite system according to claim 1, wherein there are three or more satellites configured in said respective orbits such that each satellite has a line-of-sight with at least two of the other satellites.

3. The satellite system according to claim 1, wherein the sensor is configured to observe space objects in one or more of low Earth orbit, geo-synchronous orbit, or in global positioning system orbit.

4. The satellite system according to claim 1, wherein at least one of the satellites is configured to operate in (i) a target follow mode, (ii) a staring mode, or both.

5. The satellite system according to claim 1, wherein at least one of the satellites comprises an additional sensor responsive to electromagnetic radiation in one or both of the infrared and the visible spectra.

6. The satellite system according to claim 1, wherein the wavelength of the electromagnetic radiation is approximately 200-300 nm.

7. A satellite system for observing space objects comprising:
two or more satellites positioned in an Earth orbit and configured to observe objects in various orbits including those viewed (i) against the Earth's background; (ii) against a sunlit Earth background; and (iii) against a space background; and
an electro-magnetic sensor provided on at least one of the satellites that is responsive to electromagnetic radiation having a wavelength that discriminates against substantial reflection of electromagnetic radiation from the Earth's atmosphere to observe the space object;
wherein the satellites are positioned in a retrograde sun-synchronous orbit having an inclination of approximately 82 degrees;
wherein the altitude of at least one of the satellites is approximately 1400-1600 km so as to observe space objects downward in low earth orbit and at least a second one of the satellites is approximately 400 km so as to observe space objects upwards and sideways in low earth orbit; and wherein when there are only two satellites, the second satellite is positioned apart at a half-orbital arc from the first satellite less an angle to provide a line-of-sight between the two satellites.

8. The satellite system according to claim 7, wherein there are three or more satellites configured in said respective orbits such that each satellite has a line-of-sight with at least two of the other satellites.

9. The satellite system according to claim 7, wherein the sensor is configured to observe space objects in one or more of low Earth orbit, geo-synchronous orbit, or in global positioning system orbit.

10. The satellite system according to claim 7, wherein at least one of the satellites is configured to operate in (i) a target follow mode, (ii) a staring mode, or both.

11. The satellite system according to claim 7, wherein at least one of the satellites comprises an additional sensor responsive to electromagnetic radiation in one or both of the infrared and the visible spectra.

12. The satellite system according to claim 7, wherein the wavelength of the electromagnetic radiation is approximately 200-300 nm.

13. A satellite system for observing space objects comprising:
two or more satellites positioned in an Earth orbit and configured to observe objects in various orbits including those viewed (i) against the Earth's background; (ii) against a sunlit Earth background; and (iii) against a space background; and
an electro-magnetic sensor provided on at least one of the satellites that is responsive to electromagnetic radiation having a wavelength that discriminates against substantial reflection of electromagnetic radiation from the Earth's atmosphere to observe the space object,
wherein the altitude of at least one of the satellites is approximately 400 km so as to observe space objects upwards and sideways in low earth orbit and at least a second one of the satellites is approximately 1400-1600 km so as to observe space objects downward in low earth orbit;
wherein when there are only two satellites, the second satellite is positioned apart at a half-orbital arc from the first satellite less an angle to provide a line-of-sight between the two satellites, and wherein the angle is about 18 degrees.

14. The satellite system according to claim 13, wherein the orbit of one of the satellites is one of a retrograde orbit or a prograde orbit that is configured to observe objects at an altitude of 300 km or greater.

15. The satellite system according to claim 14, wherein the retrograde orbit is a retrograde geo-synchronous orbit.

16. The satellite system according to claim 13, wherein the sensor is configured to observe space objects in one or more of low Earth orbit, geo-synchronous orbit, or in global positioning system orbit.

17. The satellite system according to claim 13, wherein at least one of the satellites is configured to operate in (i) a target follow mode, (ii) a staring mode, or both.

18. The satellite system according to claim 13, wherein at least one of the satellites comprises an additional sensor responsive to electromagnetic radiation in one or both of the infrared and the visible spectra.

19. The satellite system according to claim 13, wherein the wavelength of the electromagnetic radiation is approximately 200-300 nm.

20. A method of observing space objects using a satellite system, the method comprising:
generating commands to at least two satellites positioned in an Earth orbit to selectively observe objects in various orbits including those viewed (i) against the Earth's background; (ii) against a sunlit Earth background; and (iii) against a space background; and
generating commands to an electro-magnetic sensor provided on at least one of the satellites the that is responsive to electromagnetic radiation having a wavelength that discriminates against substantial reflection of electromagnetic radiation from the Earth's atmosphere to observe the space object,
wherein the satellites are positioned in a retrograde sun-synchronous orbit having an inclination of approximately 82 degrees, and
wherein the altitude of at least of the satellites is approximately 400 km such that the satellite is configured for observing space objects upwards and sideways in low earth orbit and at least a second one of the satellites is approximately 1400-1600 km so as to observe space objects downward in low earth orbit.

21. The method according to claim 20, wherein there are three or more satellites configured in said respective orbits such that each satellite has a line-of-sight with at least two of the other satellites.

22. The method according to claim 20, wherein the sensor is configured to observe the space object in one or more of low Earth orbit, geo-synchronous orbit, or in global positioning system orbit.

23. The method according to claim 20, wherein at least one of the satellites is configured to operate in (i) a target follow mode, (ii) a staring mode, or both.

24. The method according to claim 20, further comprising: providing at least one of the satellites with an additional sensor responsive to electromagnetic radiation in the one or both of the infrared and the visible spectra.

25. The method according to claim 20, wherein the wavelength of the electromagnetic radiation is approximately 200-300 nm.

26. A method of observing space objects using a satellite system, the method comprising:
generating commands to at least two satellites positioned in an Earth orbit to selectively observe objects in various orbits including those viewed (i) against the Earth's background; (ii) against a sunlit Earth background; and (iii) against a space background; and
generating commands to an electro-magnetic sensor provided on at least one of the satellites the that is responsive to electromagnetic radiation having a wavelength that discriminates against substantial reflection of electromagnetic radiation from the Earth's atmosphere to observe the space object,
wherein the satellites are positioned in a retrograde sun-synchronous orbit having an inclination of approximately 82 degrees, and
wherein the altitude of at least one of the satellites is approximately 1400-1600 km such that the satellite is configured for observing space objects downward in low earth orbit and at least a second one of the satellites is approximately 400 km so as to observe space objects upwards and sideways in low earth orbit; and
wherein when there are only two satellites, the second satellite is positioned apart at a half-orbital arc from the first satellite less an angle to provide a line-of-sight between the two satellites.

27. The method according to claim 26, wherein there are three or more satellites configured in said respective orbits such that each satellite has a line-of-sight with at least two of the other satellites.

28. The method according to claim 26, wherein the sensor is configured to observe the space object in one or more of low Earth orbit, geo-synchronous orbit, or in global positioning system orbit.

29. The method according to claim 26, wherein at least one of the satellites is configured to operate in (i) a target follow mode, (ii) a staring mode, or both.

30. The method according to claim 26, further comprising: providing at least one of the satellites with an additional sensor responsive to electromagnetic radiation in the one or both of the infrared and the visible spectra.

31. The method according to claim 26, wherein the wavelength of the electromagnetic radiation is approximately 200-300 nm.

32. A method of observing space objects using a satellite system, the method comprising:
generating commands to at least two satellites positioned in an Earth orbit to selectively observe objects in various orbits including those viewed (i) against the Earth's background; (ii) against a sunlit Earth background; and (iii) against a space background; and
generating commands to an electro-magnetic sensor provided on at least one of the satellites the that is responsive to electromagnetic radiation having a wavelength that discriminates against substantial reflection of electromagnetic radiation from the Earth's atmosphere to observe the space object,
wherein the altitude of at least one of the satellites is approximately 400 km so as to observe space objects upwards and sideways in low earth orbit and at least a second one of the satellites is approximately 1400-1600 km so as to observe space objects downward in low earth orbit, and
wherein when there are only two satellites, the second satellite is positioned apart at a half-orbital arc from the first satellite less an angle to provide a line-of-sight between the two satellites, and wherein the angle is about 18 degrees.

33. The method according to claim 32, wherein the orbit of one of the satellites is one of a retrograde or a prograde orbit that is configured to observe objects at an altitude of 300 km or greater.

34. The method according to claim 33, wherein the orbit is a retrograde geo-synchronous orbit.

35. The method according to claim 32, wherein the sensor is configured to observe the space object in one or more of low Earth orbit, geo-synchronous orbit, or in global positioning system orbit.

36. The method according to claim 32, wherein at least one of the satellites is configured to operate in (i) a target follow mode, (ii) a staring mode, or both.

37. The method according to claim 32, further comprising: providing at least one of the satellites with an additional sensor responsive to electromagnetic radiation in the one or both of the infrared and the visible spectra.

38. The method according to claim 32, wherein the wavelength of the electromagnetic radiation is approximately 200-300 nm.

* * * * *